United States Patent
Hao et al.

(10) Patent No.: US 7,639,611 B2
(45) Date of Patent: Dec. 29, 2009

(54) METHOD AND APPARATUS FOR PAYLOAD-BASED FLOW ESTIMATION

(75) Inventors: Fang Hao, Morganville, NJ (US); Muralidharan Sampath Kodialam, Marlboro, NJ (US); Tirunell V. Lakshman, Morganville, NJ (US); Hui Zhang, New Brunswick, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 638 days.

(21) Appl. No.: 11/372,898

(22) Filed: Mar. 10, 2006

(65) Prior Publication Data
US 2007/0211647 A1 Sep. 13, 2007

(51) Int. Cl.
*G01R 31/08* (2006.01)
(52) U.S. Cl. .................................. 370/230
(58) Field of Classification Search ............ 370/254; 709/223–226
See application file for complete search history.

(56) References Cited

U.S. PATENT DOCUMENTS

| | | | | |
|---|---|---|---|---|
| 2002/0166063 A1* | 11/2002 | Lachman et al. | ............ | 713/200 |
| 2003/0123447 A1* | 7/2003 | Smith | ............ | 370/394 |
| 2005/0270984 A1 | 12/2005 | Kodialam et al. | | |
| 2005/0270985 A1 | 12/2005 | Hao et al. | | |
| 2006/0198375 A1* | 9/2006 | Baik et al. | .................. | 370/392 |
| 2006/0212426 A1* | 9/2006 | Shakara et al. | ................. | 707/3 |
| 2007/0150623 A1* | 6/2007 | Kravec et al. | ................. | 710/1 |
| 2009/0157779 A1* | 6/2009 | Gouget et al. | ............... | 708/250 |

OTHER PUBLICATIONS

Cao et al, Summary Cache: A scalable Wide-Area Web Cache Sharing Protocol, IEEE/ACM Transactions on Networking, vol. 8, No. 3, Jun. 2000.*
M. Kodialam et al., "Runs bAsed Traffic Estimator (RATE): A Simple, Memory Efficient Scheme for Per-Flow Rate Estimation," 2004 IEEE, pp. 1808-1818.

* cited by examiner

*Primary Examiner*—Pankaj Kumar
*Assistant Examiner*—Gautam Sharma
(74) *Attorney, Agent, or Firm*—Wall & Tong, LLP

(57) ABSTRACT

The invention includes a method and apparatus for generating a coincidence count table adapted for determining at least one flow statistic. The method includes receiving a plurality of packets comprising a respective plurality of payloads, comparing payloads associated with consecutive ones of the plurality of packets for identifying at least one simple pattern included within the compared payloads of the consecutive ones of the plurality of packets, for each of the consecutive ones of the plurality of packets, if the at least one simple pattern is identified, processing the at least one simple pattern to form a complex pattern, and for each complex pattern, updating a coincidence count associated with the complex pattern, wherein the coincidence counts are adapted for determining at least one flow statistic.

22 Claims, 10 Drawing Sheets

100

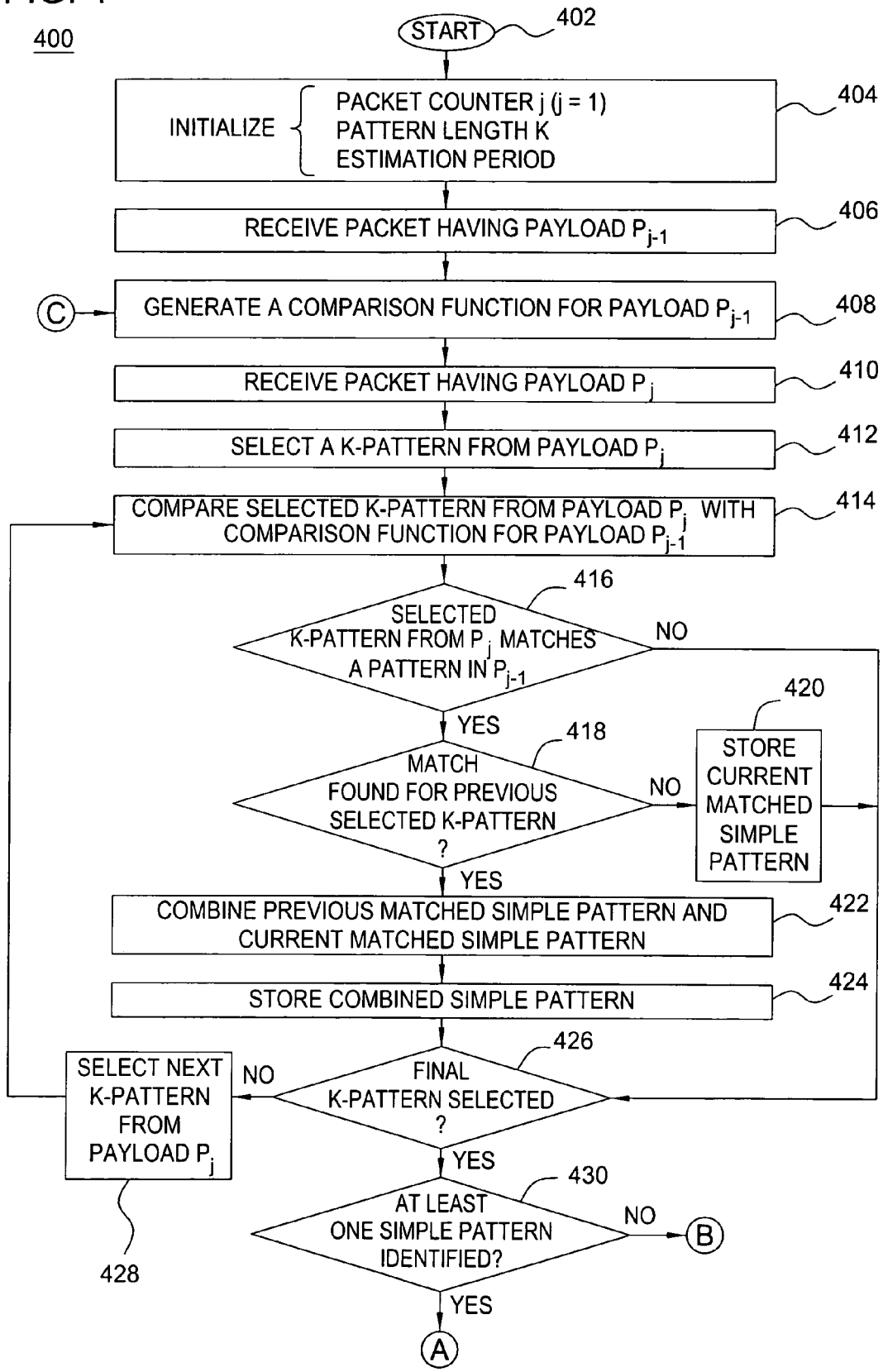

400

600

METHOD AND APPARATUS FOR PAYLOAD-BASED FLOW ESTIMATION

FIELD OF THE INVENTION

The invention relates to the field of communication networks and, more specifically, to payload-based flow estimation in packet networks.

BACKGROUND OF THE INVENTION

Typically, due to the connectionless nature of Internet Protocol (IP) networks, and for purposes of network scaling, IP routers do not maintain per-flow states of traffic flows. The real-time monitoring of traffic flows, however, is required for many network management functions, such as network traffic planning and management, network monitoring, and network security. In general, most network management functions and, therefore, most existing flow estimation techniques, require flow definitions using packet header information for determining flow membership, however, some network management functions (e.g., network security) require flow definitions using packet payload information for determining flow membership. For example, detection of potential virus signatures may require processing of both packet header information and packet payload information.

In one example, logging an anonymous File Transfer Protocol (FTP) attempt on a server in an enterprise network may require the following matches: (1) source address field (i.e., match any source address outside the enterprise network); (2) destination address field (i.e., match any destination address inside enterprise network); (3) protocol (i.e., TCP); (4) destination port (i.e., port 21 (FTP)); (5) payload (i.e., contains string "ftp" or "anonymous"). While the match for the first four fields is performed using header-based flow identification algorithms, the match for the fifth field is performed using a payload-based flow identification algorithm, which are generally more difficult and, therefore, expensive, to implement than header-based flow identification algorithms.

In general, payload-based flow identification requires difficult string-matching algorithms. Furthermore, payload-based flow identification is further complicated by: (1) for security related monitoring, the starting point of a suspicious pattern within the payload is generally not known (e.g., the signature of a virus or worm may appear anywhere in the payload); and (2) for security related monitoring, the suspicious patterns are not known (e.g., if a new, unknown worm is beginning to propagate). Disadvantageously, existing payload-based monitoring techniques lack efficiency in such situations in which either the starting point of a suspicious pattern, or even the suspicious pattern, is unknown.

SUMMARY OF THE INVENTION

Various deficiencies in the prior art are addressed through the invention of a method and apparatus for generating a coincidence count table adapted for determining at least one flow statistic. The method includes receiving a plurality of packets comprising a respective plurality of payloads, comparing payloads associated with consecutive ones of the plurality of packets for identifying at least one simple pattern included within the compared payloads of the consecutive ones of the plurality of packets, for each of the consecutive ones of the plurality of packets, if the at least one simple pattern is identified, processing the at least one simple pattern to form a complex pattern, and for each complex pattern, updating a coincidence count associated with the complex pattern, wherein the coincidence counts are adapted for determining at least one flow statistic.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention generally performs flow estimation for payload-based flow definitions (i.e., flow definitions based on patterns in packet payloads) for estimating flows having unknown, fixed-length patterns. In one embodiment, the present invention uses coincidence counting for estimating flows. In one embodiment, a pattern coincidence is identified if a pattern is identified in consecutive packets, and a pattern rate (a flow rate of packets having the identified pattern) may be estimated by counting pattern coincidences. In one embodiment, pattern coincidence counting is performed using hashing schemes for string matching.

The present invention provides an accurate, memory-efficient algorithm for performing flow estimation for payload-based flow estimation. Since, in one embodiment, coincidence counting involves a comparison of only two packet payloads (i.e., consecutively received packet payloads), the present invention may be implemented in hardware or software, as well as various combinations thereof. As such, the present invention enables accurate, memory-efficient estimation of payload-based flow statistics for use in performing various network management functions such as traffic engineering, traffic management, network security (e.g., virus detection, worm detection, and the like), and like management functions, as well as various combinations thereof.

Figure 1:
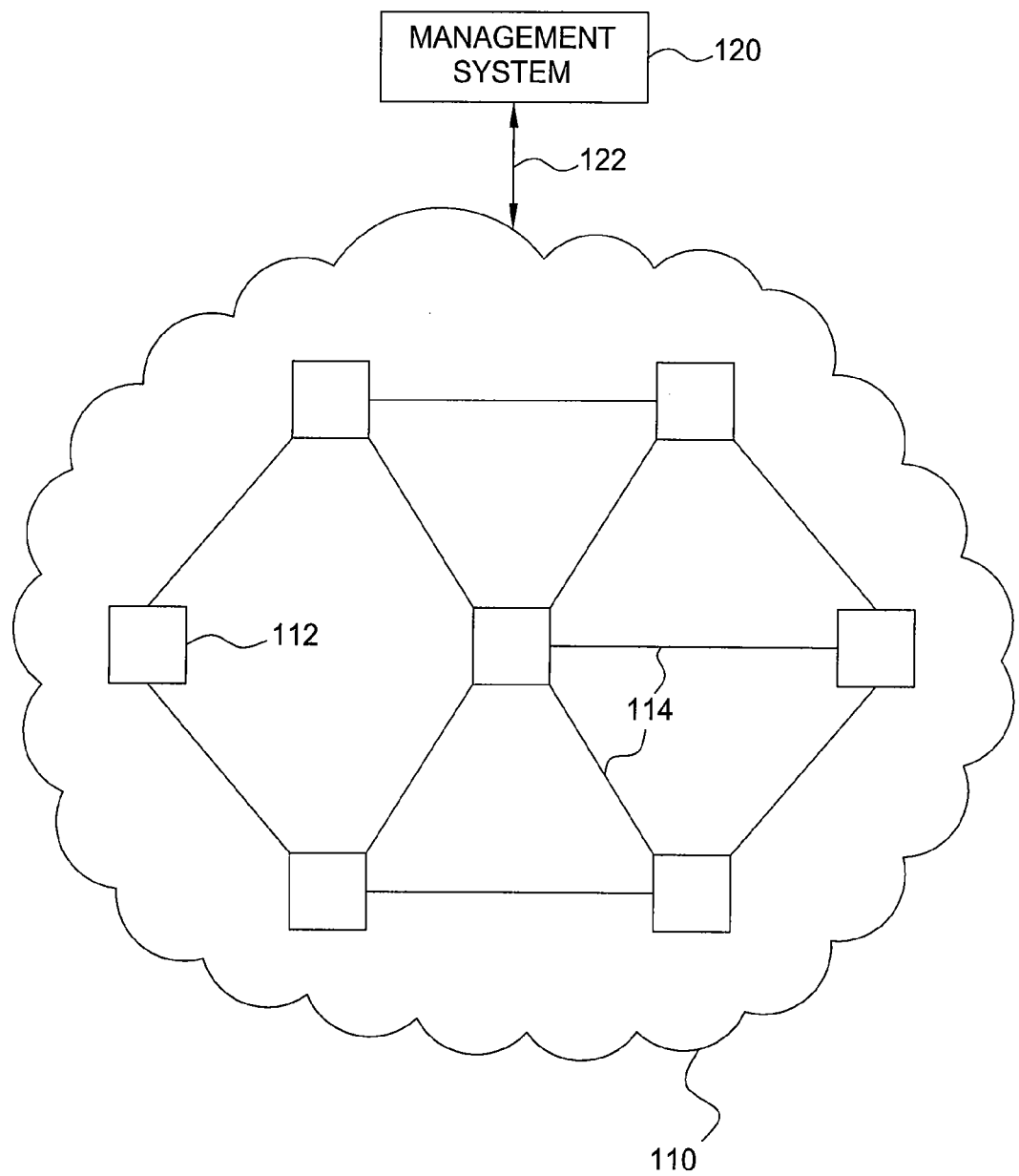
FIG. 1 depicts a high-level block diagram of a packet communication network.

FIG. 1 depicts a high-level block diagram of a communication network. Specifically, communication network 100 of FIG. 1 includes a network 110 and a management system 120. As depicted in FIG. 1, network 110 includes a plurality of nodes 112 (collectively, nodes 112) in communication using a plurality of links 114 (collectively, links 114). In one embodiment, nodes 112 operate as routers. In one such embodiment, network 110 is an IP network. Although depicted as comprising a specific network type and associated network configuration, the present invention may be used in various other network types, as well as various other network configurations having fewer or more nodes, fewer or more links, different node and link configurations, and the like, as well as various combinations thereof.

The nodes 112 include network elements adapted for conveying packets from source node to destination node. In one embodiment, nodes 112 include packet forwarding capabilities. In one embodiment, nodes 112 include packet routing capabilities. As depicted in FIG. 1, nodes 112 may operate as source nodes, intermediate nodes, and destination nodes for a plurality of traffic flows (e.g., on the order of thousands or on the order of millions, depending upon the flow definition). In one embodiment, nodes 112 may be adapted for processing arriving packets (where each arriving packet is associated with one of a plurality of defined traffic flows) for determining various flow statistics (e.g., flow rate estimates, flow percentage estimates, and the like, as well as various combinations thereof).

In general, a flow in a packet network may be defined using any information included in the packets transported over the packet network. In one embodiment, a flow definition may be formed using packet payload information. In one such embodiment, a flow definition may be formed such that a flow corresponding to the flow definition includes packets having identical patterns in respective packet payloads. Although described herein with respect to a specific flow definition, the present invention may be used for determining flow statistics using various other flow definitions (e.g., using less or more information, using other combinations of packet payload information, and the like, as well as various combinations thereof).

As depicted in FIG. 1, management system 120 communicates with network 110 (using a management communication link 122) for performing various management functions, such as network planning, traffic planning, traffic management, service level assurance, network security, and like management functions, as well as various combinations thereof. In one embodiment, management system 120 performs at least a portion of such management functions using traffic flow statistics. In one embodiment, management system 120 obtains at least a portion of the traffic flow statistics from network 110. In one such embodiment, management system 120 obtains traffic flow statistics determined (e.g., measured, estimated, predicted, and the like) by nodes 112.

Figure 2:
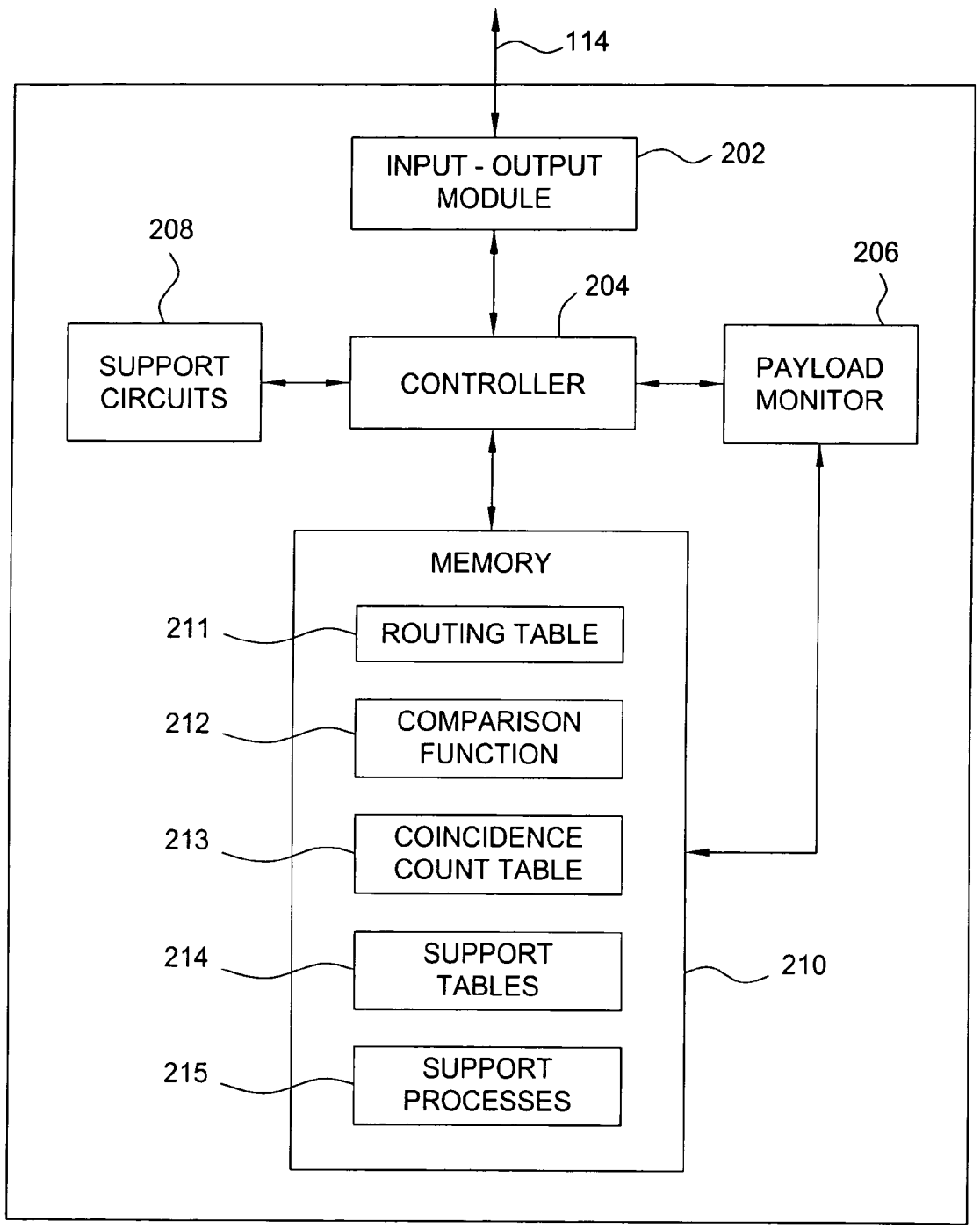
FIG. 2 depicts a high-level block diagram of a node of the packet communication network of FIG. 1.

FIG. 2 depicts a high-level block diagram of a node of the communication network of FIG. 1. Specifically, node 112 of FIG. 2 comprises an input-output (I/O) module 202, a controller 204, a payload monitor 206, support circuits 208, and a memory 210. As depicted in FIG. 2, controller 204 is coupled to I/O module 202, payload monitor 206, support circuits 208, and memory 210, and payload monitor 206 is coupled to memory 210. Although depicted as comprising a specific configuration of components, various other hardware, firmware, or software components, as well as various combinations and configurations thereof, may be utilized for performing various functions of the present invention As depicted in FIG. 2, memory 210 comprises a routing table 211 for routing packets within network 110, a comparison function 212 for comparing payloads of consecutively received packets, a predecessor table for maintaining a plurality of previous arrivals (e.g., k most recent packets received by node 112), a coincidence count table 213 for maintaining total coincidence counts for flows identified by node 112 (e.g., flows based on complex patterns identified within payloads of packets belonging to the identified flows), a plurality of support tables 214, and a plurality of support processes 215.

As depicted in FIG. 2, I/O module 202 supports communication with other nodes 112 in network 110 using at least one link 114 (depicted as a single link for purposes of clarity). As depicted in FIG. 2, I/O module 202 receives packets from nodes 112. The I/O module 202 forwards received packets to controller 204. In one embodiment, controller 204 forwards received packets to payload monitor 206 for consecutive payload comparison processing. In another embodiment, controller 204 extracts the payload of each received packet and forwards the extracted payload to payload monitor 206 for consecutive payload comparison processing. In one embodiment, controller 204 performs at least a portion of the functions described herein. In one embodiment, payload monitor 206 performs at least a portion of the functions described herein.

The payload monitor 206, in combination with I/O module 202, controller 204, support circuits 208, and memory 210 perform various functions described herein (e.g., k-pattern selection, hash computation, comparison structure formation, comparison structure access functions for intersection identification, simple pattern storage, complex pattern storage, coincidence count table access functions, coincidence count table update functions, and the like, as well as various combinations thereof). Although described herein as being implemented in hardware, software, or a hardware/software combination, at least a portion of the functions described herein may be implemented using any hardware, firmware, or software, as well as various combinations thereof.

The payload monitor 206 processes each packet payload received by I/O module 202. In one embodiment, a packet payload may be viewed as a byte stream. In one such embodiment, a packet payload may be viewed as a byte stream which may be represented as an integer vector of hexadecimal values over [0:FF]. As described herein, payload monitor 206 is adapted for identifying pattern coincidences, where a pattern coincidence is identified if a pattern in identified in consecutive packet payloads. In one embodiment, a pattern coincidence may comprise inclusion of a complex pattern (including at least one simple pattern) in consecutive packet payloads.

In one embodiment, a simple pattern is defined as an ordered sequence of bytes. A packet includes a simple pattern if the sequence of bytes appears anywhere in the packet payload. For example, consider a simple pattern $Q_s$=[37 A0 9B]. A k-simple-pattern is a simple pattern including at least k bytes. In one embodiment, a complex pattern is defined as a collection of simple patterns. In one embodiment, simple patterns from which a complex pattern is formed may be denoted as components of the complex pattern. In one embodiment, ordering of simple patterns within a complex pattern is irrelevant. For example, consider a complex pattern $Q_C$=[{37 A0 9B} {7B FA 82 43}] including two simple patterns. For example, the payload P [23 7B FA 82 43 89 57 37 A0 9B 85 31 5] includes simple pattern $Q_S$ and complex pattern $Q_C$. A k-complex-pattern is a complex pattern for which each simple pattern of which the complex pattern is composed is a k-simple-pattern.

In general, given a pattern Q, an arrival rate of pattern Q is defined as an arrival rate of packets including pattern Q (where pattern Q may include a k-simple pattern or a k-complex-pattern). In one embodiment, pattern rate estimation is performed over a time interval referred to herein as the estimation period (i.e., estimation time). In general, in order to determine an exact flow rate for a k-pattern, every k-pattern associated with every packet payload processed by payload monitor 206 must be hashed into a hash table for counting the number of packets conveying each k-pattern. Since such hashing requirements are prohibitively expensive, in terms of both processing power and required memory, the present invention estimates flow rates for k-patterns using coincidence counting.

In one embodiment, since measuring the total number of packets processed by a payload monitor is relatively simple, estimation of a payload-based flow rate (i.e., rate of a specific pattern) may be expressed as a determination of the fraction of packets $f_Q$ including a k-pattern $Q_K$. In this embodiment, an estimator may be defined for $f_Q$ (denoted as $\hat{f}_Q$) such that, with probability greater than $\alpha$, $\hat{f}_Q \in (f_Q - \beta, f_Q + \beta)$, where $\beta$ denotes accuracy of the flow measurement. In general, estimation period and required memory generally depend on the required accuracy of the flow measurement. The present invention provides accurate estimation of payload-based flow rates while minimizing estimation period and required memory.

Figure 3:
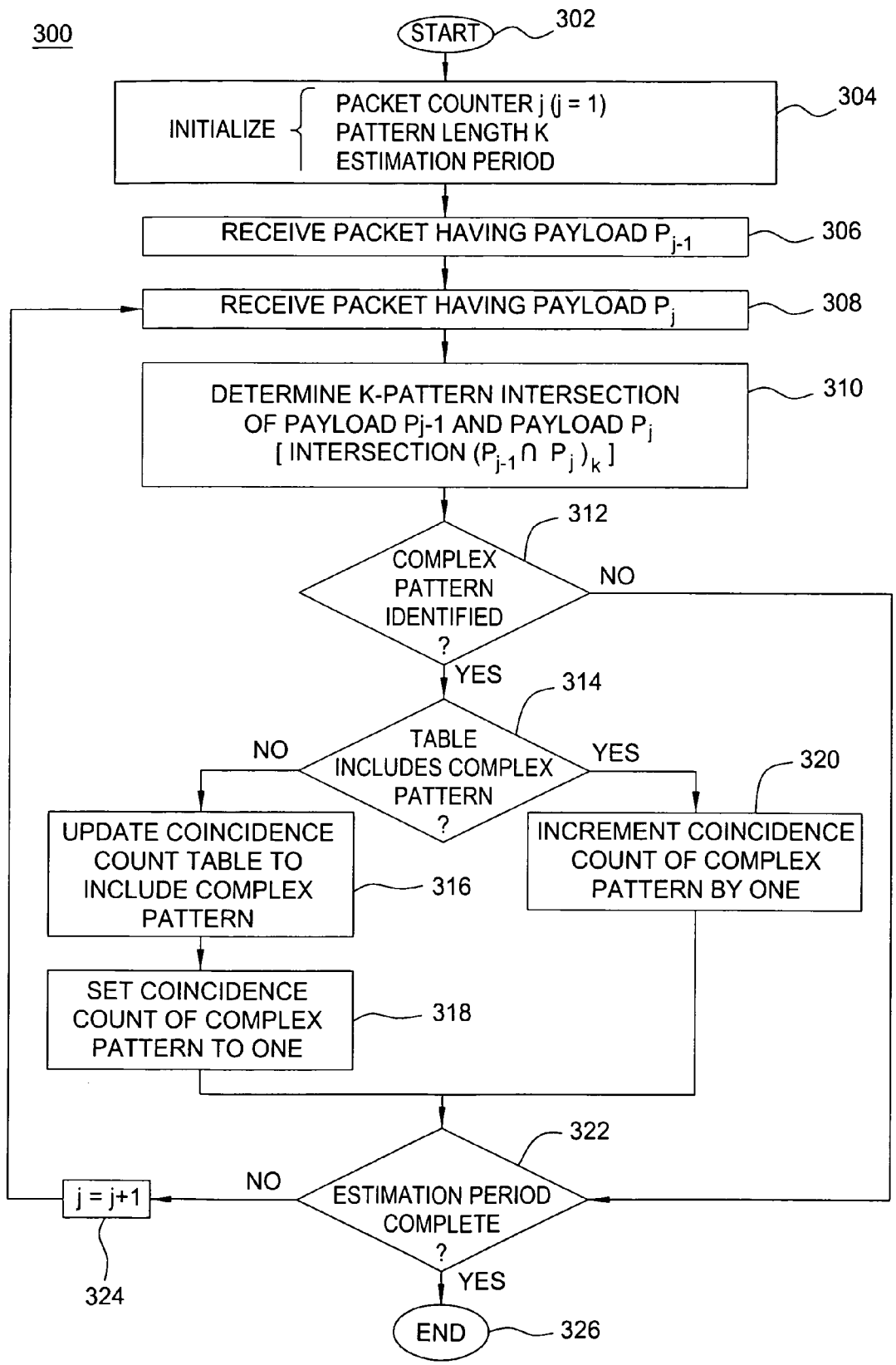
FIG. 3 depicts a method according to one embodiment of the present invention.

FIG. 3 depicts a method according to one embodiment of the present invention. Specifically, method 300 of FIG. 3 includes a method for generating a coincidence count table for tracking coincidences of complex patterns (i.e., identification of a complex pattern in consecutive packets), where the coincidence count table is adapted for determining at least one flow statistic. Although described herein with respect to one of the nodes 112, method 300 may be performed at each of the nodes 112. Although depicted as being performed serially, those skilled in the art will appreciate that at least a portion of the steps of method 300 may be performed contemporaneously, or in a different order than presented in FIG. 3. The method 300 begins at step 302 and proceeds to step 304.

At step 304, a packet counter (denoted as j) is initialized to one (i.e., j=1), a pattern length k is initialized, and an estimation period is initialized. At step 306, a packet having a payload $P_{j-1}$ is received (denoted as a previous packet). At step 308, a packet having a payload $P_j$ is received (denoted as a current packet). At step 310, a k-pattern intersection of previous payload $P_{j-1}$ and current payload $P_j$ is determined (denoted as $(P_{j-1} \cap P_{j-1})_k$). In one embodiment, processing for identifying a k-pattern intersection of previous payload $P_{j-1}$ and current payload $P_j$ is performed using at least a portion of the methodologies depicted and described herein with respect to FIG. 4 and FIG. 5.

At step 312, a determination is made as to whether a complex pattern is identified. In one embodiment, as described herein, a complex pattern includes at least one simple pattern (i.e., at least one k-simple-pattern). If a complex pattern is not identified from intersection $(P_{j-1} \cap P_{j-1})_k$, method 300 proceeds to step 322. If a complex pattern is identified from intersection $(P_{j-1} \cap P_{j-1})_k$, method 300 proceeds to step 314, at which point a determination is made with respect to updating a coincidence count table for the identified complex pattern (i.e., adding a new complex pattern to the coincidence count table with a coincidence count of one or incrementing the coincidence count of an existing complex pattern).

At step 314, a determination is made as to whether the coincidence count table includes the complex pattern identified from intersection $(P_{j-1} \cap P_{j-1})_k$. If the coincidence count table does not include the identified complex pattern, method 300 proceeds to step 316. At step 316, the coincidence count table is updated to include an entry for the identified complex pattern. At step 318, a coincidence count of the identified complex pattern is set to one in the coincidence count table. If the coincidence count table does include the identified complex pattern, method 300 proceeds to step 320. At step 320, the coincidence count of the identified complex pattern is incremented by one in the coincidence count table. From steps 318 and 320, method 300 proceeds to step 322.

At step 322, a determination is made as to whether the estimation period is complete. If the estimation period is not complete, method 300 proceeds to step 324. In one embodiment, the estimation period may include at least one of a length of time, a number of processed packets, a number of processed bytes, and the like, as well as various combinations thereof. At step 324, the packet counter j is incremented by one (i.e., j=j+1). In other words, the current packet becomes the previous packet for comparison with the next received packet. From step 324, method 300 returns to step 308, at which point a next packet is received. If the estimation period is complete, method 300 proceeds to step 326. At step 326, method 300 ends.

In one embodiment, consider a sequence of packet arrivals $A_1, A_2, \ldots, A_{j-1}, A_j, \ldots$ having packet payloads $P_1, P_2, \ldots, P_{j-1}, P_j, \ldots$, respectively. For example, consider two consecutive packets having payloads $P_{j-1}$=[32 45 56 67 78 3 34 12 56 D0 E4] and $P_j$=[32 7A 89 45 56 67 7B 7 EE 34 12 56 D0 19], where each value represents a hexadecimal representation of a byte in the packet payload. In this example, previous packet payload $P_{j-1}$ includes eleven bytes and current packet payload $P_j$ includes fourteen bytes. In one embodiment, payload intersection processing is performed for identifying k-patterns (i.e., patterns including at least k bytes) common to both previous packet payload $P_{j-1}$ and current packet payload $P_j$.

In continuation of this example, an assumption is made that payload intersection processing is performed for patterns including at least three bytes (k=3). In this example, intersection processing of consecutive payloads $P_{j-1}$ and $P_j$ produces three overlap patterns $Q_1$=[32], $Q_2$=[45 56 67], and $Q_3$=[34 12 56 D0]. In this example, since overlap pattern $Q_1$=[32] includes less than three bytes, overlap pattern $Q_1$=[32] is ignored (note that, in one embodiment of intersection processing, overlap pattern $Q_1$ is not identified as a pattern). In this example, since overlap pattern $Q_2$=[45 56 67] includes three bytes, overlap pattern $Q_2$=[45 56 67] is maintained. In this example, since overlap pattern $Q_3$=[34 12 56 D0] includes four bytes, overlap pattern $Q_3$=[34 12 56 D0] is maintained.

In this example, since overlap pattern $Q_3$=[34 12 56 D0] includes four bytes, overlap pattern $Q_3$=[34 12 56 D0] may be viewed as two three-byte patterns [34 12 56] and [12 56 D0] since shorter patterns may be inferred from longer patterns. In one embodiment, longest overlap patterns are maintained. In this example, assuming longest overlap patterns are maintained, the complex pattern identified from the intersection of consecutive payloads $P_{j-1}$ and $P_j$ for k=3 (denoted as $(P_{j-1} \cap P_j)_3$) is [{45 56 67}{34 12 56 D0}]. The intersection $(P_{j-1} \cap P_j)_3$=[{45 56 67}{34 12 56 D0}] comprises a coincidence, and identified coincidences are maintained in a coincidence count table adapted for tracking the number of coincidences for each pattern.

Figure 4:
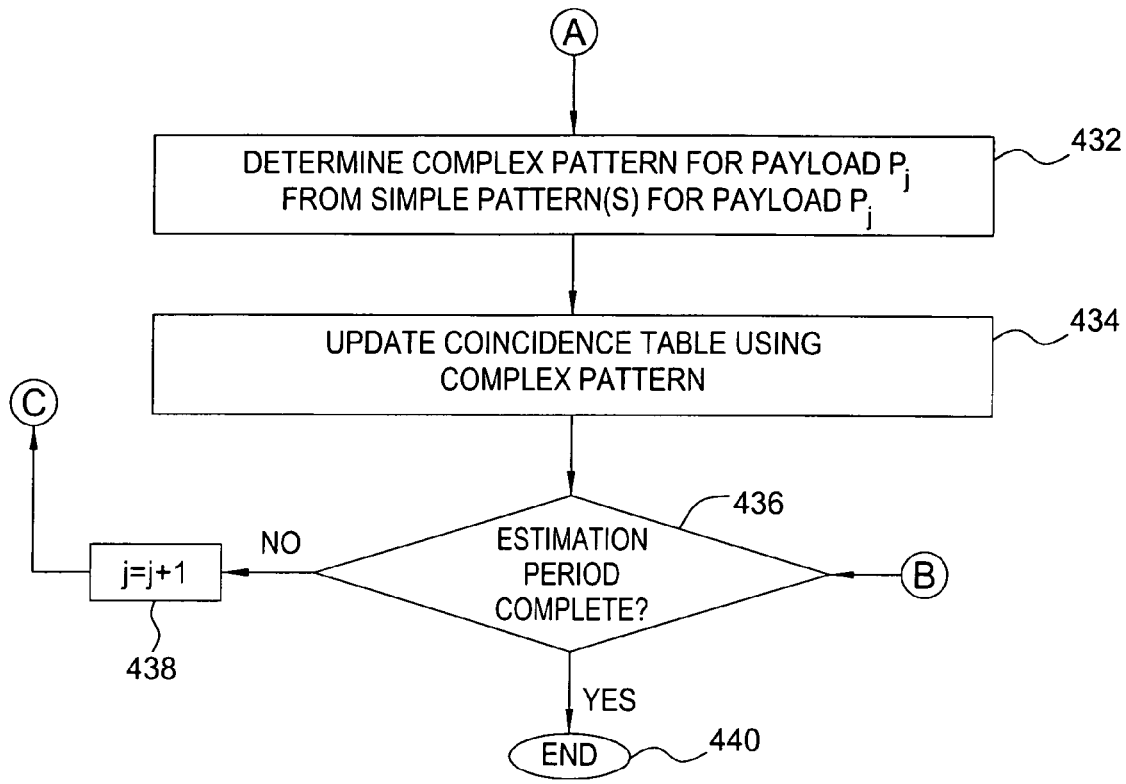
FIG. 4 depicts a method according to one embodiment of the present invention.

FIG. 4 depicts a method according to one embodiment of the present invention. Specifically, method 400 of FIG. 4 includes a method for generating a coincidence count table for tracking coincidences of complex patterns (i.e., identification of a complex pattern in consecutive packets), wherein the coincidence count table is adapted for determining at least one flow statistic. Although described herein with respect to one of the nodes 112, method 400 may be performed at each of the nodes 112. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a packet counter (denoted as j) is initialized to one (i.e., j=1), a pattern length k is initialized, and an estimation period is initialized. At step 406, a packet having a payload $P_{j-1}$ is received (denoted as a previous payload). At step 408, a comparison function is generated for previous payload $P_{j-1}$. In one embodiment, the comparison function is generated during k-pattern match processing performed during a comparison between payload $P_{j-2}$ and payload $P_{j-1}$ (i.e., during a previous processing round in which previous payload $P_{j-1}$ underwent k-pattern match processing as a current payload and other payload $P_{j-2}$ underwent k-pattern match processing as a previous payload).

In one embodiment, the comparison function is generated for previous payload $P_{j-1}$ using at least one hash function. In one such embodiment, the comparison function may be generated using a fingerprinting technique. In one such embodiment, the comparison function may be generated using Rabin fingerprinting. In one embodiment, the comparison function generated for previous payload $P_{j-1}$ comprises a filter. In one such embodiment, the comparison function generated for previous payload $P_{j-1}$ comprises a bloom filter. In one such embodiment, the bloom filter generated for previous payload $P_{j-1}$ comprises an M-bit array.

At step 410, a packet having a payload $P_j$ is received (denoted as a current payload). At step 412, a k-pattern is selected from payload $P_j$. In one embodiment, k-pattern selection operates in a manner similar to a sliding window implementation. In one such embodiment, a k-byte sliding window may be advanced by one byte following k-pattern match processing of each selected k-pattern. For example, three-pattern selection for a payload $P_j$=[32 45 56 67 78] results in three three-pattern selections (i.e., first three-pattern=[32 45 56], second three-pattern=[45 56 67], and third three-pattern=[56 67 78]). In this example, a three-byte window slides one byte following three-pattern match processing of the currently selected three-pattern.

At step 414, the selected k-pattern from current payload $P_j$ is compared with the comparison function (e.g., bloom filter) for previous payload $P_{j-1}$. At step 416, a determination is made as to whether the selected k-pattern from current payload $P_j$ matches a pattern from previous payload $P_{j-1}$ (or, in one embodiment, the selected k-pattern from current payload $P_j$ potentially matches a pattern from previous payload $P_{j-1}$). If the selected k-pattern from payload $P_j$ does not potentially match a pattern from payload $P_{j-1}$, method 400 proceeds to step 426. If the selected k-pattern from payload $P_j$ does potentially match a pattern from payload $P_{j-1}$, method 400 proceeds to step 418.

In one embodiment, a match between the selected k-pattern from current payload $P_j$ and the comparison function for previous payload $P_{j-1}$ is considered a potential match (as opposed to an absolute match) due to a possibility of false positives being identified during payload intersection processing. In one embodiment, for example, in which a plurality of hash functions and a bloom filter are utilized for performing processing for identifying intersections between current payload $P_j$ and previous payload $P_{j-1}$, the probability of a false positive match between the selected k-pattern from current payload $P_j$ and the comparison function for previous payload $P_{j-1}$, although low, is not zero. In this embodiment, an additional string comparison may be performed for verifying a match between the selected k-pattern from current payload $P_j$ and a pattern from previous payload $P_{j-1}$.

At step 418, a determination is made as to whether a match was identified for the previous selected k-pattern (i.e., the k-pattern from current payload $P_j$ selected and processed immediately prior to the selection and processing of the currently selected k-pattern from current payload $P_j$). If a match was not identified for the previous selected k-pattern, method 400 proceeds to step 420. At step 420, the current matched simple pattern is stored. In one embodiment, the current matched simple pattern is stored for use, during processing of subsequent k-patterns selected from current payload $P_j$, in identifying a longest matched simple pattern. From step 420, method 400 proceeds to step 426. If a match was identified for the previous selected k-pattern, method 400 proceeds to step 422.

At step 422, the previous matched simple pattern (i.e., a match between the previous selected k-pattern (i.e., immediately previous) from current payload $P_j$ and a pattern from payload $P_{j-1}$) and current matched simple pattern (i.e., a match between the current selected k-pattern from payload $P_j$ and a pattern from payload $P_{j-1}$) are combined. In other words, adjacent simple patterns are combined for identifying longest simple patterns common to payload $P_j$ and payload $P_{j-1}$. At step 424, the combined matched simple pattern is stored. In one embodiment, the combined matched simple pattern is stored for use, during processing of subsequent k-patterns selected from current payload $P_j$, in identifying a longest matched simple pattern.

At step 426, a determination is made as to whether the final k-pattern in current payload $P_j$ has been processed. If the final k-pattern in current payload $P_j$ has not been processed, method 400 proceeds to step 428. At step 428, the next k-pattern is selected from current payload $P_j$ (e.g., using a k-byte-sized sliding window that slides one byte for selecting each new k-pattern). From step 428, method 400 returns to step 414, at which point the next selected k-pattern from current payload $P_j$ is compared with the comparison function for previous payload $P_{j-1}$. If the final k-pattern in current payload $P_j$ has been processed, method 400 proceeds to step 430.

At step 430, a determination is made as to whether at least one simple pattern has been identified (i.e., whether the intersection $(P_j \cap P_{j-1})_k$ results in identification of a coincidence between current payload $P_j$ and previous payload $P_{j-1}$). If at least one simple pattern has not been identified from intersection $(P_j \cap P_{j-1})_k$, method 400 proceeds to step 436. If at least one simple pattern has been identified from intersection $(P_j \cap P_{j-1})_k$, method 400 proceeds to step 432. At step 432, a complex pattern for payload $P_j$ is determined from the simple pattern(s) for payload $P_j$ (i.e., simple patterns identified from determining the intersection of current payload $P_j$ and previous payload $P_{j-1}$). At step 434, the coincidence count table is updated using the complex pattern (i.e., for maintaining a count associated with each coincidence identified during the estimation period).

At step 436, a determination is made as to whether the estimation period is complete. In one embodiment, the estimation period may include at least one of a length of time, a number of processed packets, and the like, as well as various combinations thereof. If the estimation period is not complete, method 400 proceeds to step 438. At step 438, the packet counter j is incremented by one (i.e., j=j+1). In other words, the current packet becomes the previous packet for comparison with the next received packet. From step 438, method 400 returns to step 408, at which point a comparison function is generated for previous payload $P_{j-1}$. If the estimation period is complete, method 400 proceeds to step 440. At step 440, method 400 ends.

Figure 5:
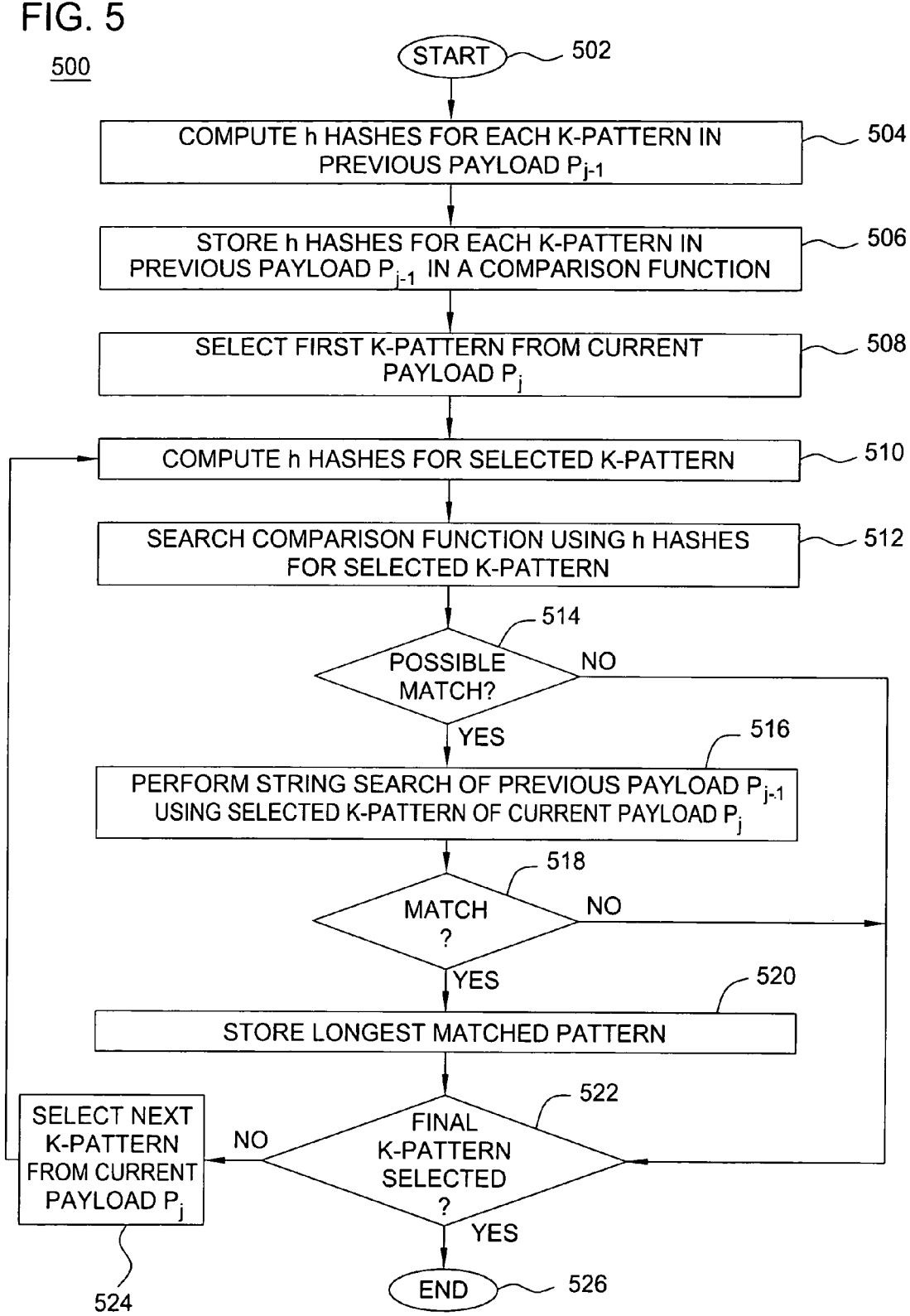
FIG. 5 depicts a method according to one embodiment of the present invention.

FIG. 5 depicts a method according to one embodiment of the present invention. Specifically, method 500 of FIG. 5 includes a method for determining the intersection of current payload $P_j$ and previous payload $P_{j-1}$ $(P_j \cap P_{j-1})_k$ using hash functions and a comparison function. Although described herein with respect to one of the nodes 112, method 500 may be performed at each of the nodes 112. Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, h hashes are computed for each k-pattern in previous payload $P_{j-1}$. In one embodiment, hashes are computed using a fingerprinting technique. In one such embodiment, hashes are computed using a Rabin fingerprinting technique. At step 506, the h hashes computed for each k-pattern in previous payload $P_{j-1}$ are stored in a comparison function for previous payload $P_{j-1}$ (e.g., a comparison function is generated for previous payload $P_{j-1}$). In one embodiment, the comparison function generated for previous payload $P_{j-1}$ comprises a filter. In one such embodiment, the comparison function generated for previous payload $P_{j-1}$ comprises a bloom filter. In one such embodiment, the bloom filter is implemented as an M-bit array.

At step 508, a first k-pattern from current payload $P_j$ (i.e., the first k bytes in current payload $P_j$) is selected. At step 510, h hashes are computed for the k-pattern selected from current payload $P_j$. In one embodiment, hashes are computed using a fingerprinting technique. In one such embodiment, hashes are computed using a Rabin fingerprinting technique. At step 512, the comparison function generated for previous payload $P_{j-1}$ is searched using the h hashes computed for the k-pattern selected from current payload $P_j$. In one embodiment, in which the comparison function generated for previous payload $P_{j-1}$ comprises a bloom filter, the bloom filter associated with previous payload $P_{j-1}$ is searched using the h hashes computed for the k-pattern selected from current payload $P_j$.

At step 514, a determination is made as to whether a potential match between the h hashes computed for the selected k-pattern from current payload $P_j$ and the comparison function for previous payload $P_{j-1}$ is identified. As described herein, a match between the h hashes computed for the k-pattern selected from current payload $P_j$ and the comparison function generated for previous payload $P_{j-1}$ is considered a potential match due to the possibility of the identification of a false positive (i.e., the comparison between the h hashes computed for the selected k-pattern from current payload $P_j$ and the comparison function for previous payload $P_{j-1}$ incorrectly indicates that the k-pattern in current payload $P_j$ matches a pattern in previous payload $P_{j-1}$). If a potential match is not identified, method 500 proceeds to step 522. If a potential match is identified, method 500 proceeds to step 516.

At step 516, a string search of previous payload $P_{j-1}$ is performed using the selected k-pattern of current payload $P_j$ (i.e., a determination is made as to whether the k-pattern selected from current payload $P_j$ exists within previous payload $P_{j-1}$). The string search of previous payload $P_{j-1}$ using the k-pattern selected from current payload $P_j$ is performed in order to verify that a coincidence (i.e., a pattern common to both previous payload $P_{j-1}$ and current payload $P_j$) has in fact been identified (as opposed to identification of a false positive from the comparison between the h hashes computed for the k-pattern selected from current payload $P_j$ and the comparison function generated for previous payload $P_{j-1}$).

At step 518, a determination is made as to whether a string-based match between the selected k-pattern of current payload $P_j$ and a corresponding pattern in previous payload $P_{j-1}$ is identified. If the there is not a string-based match between the selected k-pattern of current payload $P_j$ and a corresponding pattern in previous payload $P_{j-1}$, method 500 proceeds to step 522. If the there is a string-based match between the selected k-pattern of current payload $P_j$ and a corresponding pattern in previous payload $P_{j-1}$, method 500 proceeds to step 520. At step 520, the longest matched simple pattern is stored. In one embodiment, storage of the longest matched simple pattern is performed using comparisons between consecutive k-patterns selected from current payload $P_j$. In one such embodiment, storage of the longest matched simple pattern is performed as depicted and described herein with respect to steps 418-424 of FIG. 4.

At step 522, a determination is made as to whether the final k-pattern in current payload $P_j$ has been processed. If the final k-pattern in current payload $P_j$ has not been processed, method 500 proceeds to step 524. At step 524, the next k-pattern is selected from current payload $P_j$. In one embodiment, the selection of k-patterns from current payload $P_j$ is performed using a k-byte sliding window. From step 524, method 500 returns to step 510, at which point h hashes are computed for the next selected k-pattern from current payload $P_j$. If the final k-pattern in current payload $P_j$ has been processed, method 500 proceeds to step 526. At step 526, the method 500 ends.

In one embodiment, given consecutive payloads $P_{j-1}$ having $L_{j-1}$ bytes and $P_j$ having $L_j$ bytes, k-intersections $(P_{j-1} \cap P_j)_K$ may be computed using hash functions and a bloom filter. In this embodiment, each k-pattern in payload $P_{j-1}$ is hashed into a bloom filter, and each k-pattern in payload $P_j$ is compared against the bloom filter for determining whether an intersection is identified. In other words, a bloom filter may be used for summarizing k-patterns from a previously processed payload. In one such embodiment, upon identifying an intersection, a string match may be performed for verifying correct identification of the intersection (i.e., for preventing a false positive). In one embodiment, the false positive rate may be minimized by adjusting the number of hash functions or the length of the bloom filter.

In one embodiment, fingerprinting (e.g. Rabin fingerprinting) may be used for generating hashes for the bloom filter (i.e., for computing multiple hashes for each k-pattern in the packet payloads). In one such embodiment, once the hash function is computed for the first k-pattern, the hash for each additional k-pattern may be computed in O(1) time. Furthermore, computation of each hash function is linear in the length of the string. Since the hash functions can be computed in linear time in the length of the string, and the comparison against the bloom filter can be done in O(1) time, the entire approximate intersection in an embodiment utilizing a hash function and a bloom filter can be done in time $O(L_1+L_2)$.

In one embodiment, in which hashing and a bloom filter are utilized for computing k-intersections, a hash function is computed for all k-patterns in the payload. In this embodiment, assuming arrival of a payload $P=[c_1\ c_2 \ldots c_l]$, where l>k, a prime q may be used for computing the hash functions for all k-patterns in payload P. The hash function for the first k-pattern is computed as $H_1 = c_1 q^{k-1} + c_2 q^{k-2} + \ldots + c_{k-1} q + c_k$ (Mod M), where M is the number of bits in the bloom filter. The hash function for the second k-pattern is computed as $H_2 = c_2 q^{k-1} + c_3 q^{k-2} + \ldots + c_k q + c_{k+1}$ (Mod M), and may be simplified to $H_2 = q H_1 - c_1 q^k + C_{k+1}$ (Mod M). By pre-computing values of $c_1 q^k$ (Mod M) for all values that $c_1$ can take (e.g., in the case of one byte, 255 values), $H_2$ can be computed from $H_1$ in constant time. This process is repeated for all k-patterns in payload P. Since multiple hash functions are required, a different prime number, chosen uniformly in the interval [1, . . . , M], is selected for each hash function. This hash technique outperforms many commonly used hashing functions, and may be implemented in hardware or software.

In one embodiment, in which hashing and a bloom filter are utilized for computing k-intersections, the bloom filter is implemented as an M-bit binary string. As described herein with respect to hashing, the h hashes for each k-pattern in payload $P_{j-1}$ are computed, and corresponding bits in the bloom filter are set equal to one. For each k-pattern in payload $P_j$, h hashes are computed. The h hashes computed for payload $P_j$ are compared to the h hashes previously computed for payload $P_{j-1}$. If all h bits are set, a determination is made that there is at least a possibility of a coincidence, and, as described herein, a detailed string matching is performed for verifying identification of a coincidence. While comparing k-patterns in payload $P_j$ with k-patterns in payload $P_{j-1}$, the probability of a false positive coincidence is given by:

$$1-\left(1-\left(1-\exp\left(-\frac{hl_1}{M}\right)\right)^h\right)^{l_2}$$

As described herein, the length of the bloom filter and the number of hashes may be adjusted in order to control the probability of a false positive. In one embodiment, the length of the bloom filter and the number of hashes may be adjusted to ensure that the probability of a false positive is minimized. For example, processing 1500 byte packets using a 200 Kbit bloom filter and 6 hash functions, the probability of a false positive for two strings that do not have any match is given by: $[1-(1-(1-\exp(-9000/10000))^6)^{1500}] \approx 6.1 \times 10^{-4}$. In other words, an average of six false positives may be expected over one thousand processed strings. Furthermore, using the present invention, for shorter payloads, the false positive probability is even lower.

In one embodiment, following construction of the bloom filter for payload $P_{j-1}$, a hash function is computed for every set of consecutive k bytes of payload $P_j$ (starting from the first byte). In this embodiment, let Q represent the current pattern in payload $P_j$ that is being compared. If each bit that Q hashes to in the bloom filter is set, a potential coincidence is identified. In response to identification of the potential coincidence, current pattern Q is compared with $P_{j-1}$ in order to confirm identification of a coincidence (rather than a false positive). In response to confirmation of the coincidence, the location of the coincidence within payload $P_j$ may be stored. Following processing of current pattern Q, the k-window is moved by one byte and the comparison processing is repeated. If a new coincidence is identified, a comparison of coincidence locations provides an indication as to whether the common pattern is longer than k. This processing is repeated until the entire payload $P_j$ is processed.

In continuation of the example in which $P_{j-1}$=[32 45 56 67 78 3 34 12 56 D0 E4], $P_j$=[32 7A 89 45 56 67 7B 7 EE 34 12 56 D0 19], and k=3, from the bloom filter (or, in the case of a false positive, from direct comparison), a determination is made that there is no match for the first three-byte pattern of $P_j$ [32 7A 89], the second three-byte pattern of $P_j$[7A 89 45], or the third three-byte pattern of $P_j$[89 45 56]. A match is identified for the fourth three-byte pattern of $P_j$[45 56 67]. As such, since there is no match for the next three-byte pattern (i.e., the fifth three-byte pattern) of $P_j$[56 67 7B], the simple pattern ends. There is no match for the next four three-byte patterns of $P_j$: [67 7B 7], [7B 7 EE], [7 EE 34], and [EE 34 12].

In continuation of this example, a match is identified for the tenth three-byte pattern of $P_j$[34 12 56] (at byte seven of previous payload $P_{j-1}$). A match is identified for the next three-byte pattern (i.e., the eleventh three-byte pattern) of $P_j$[12 56 D0] (at byte eight of previous payload $P_{j-1}$). Since matches are identified on consecutive byte positions, the identified pattern is extended by one byte to include [34 56 12 D0]. There is no match for the final three-byte patterns of $P_j$: [56 D0 19]. As such, in this example, the intersection of previous payload $P_{j-1}$=[32 45 56 67 78 3 34 12 56 D0 E4] and current payload $P_j$=[32 7A 89 45 56 67 7B7EE 34 12 56 D0 19] for k=3 is the complex pattern [{45 56 67} {34 12 56 D0}] including two simple patterns [45 56 67] and [34 12 56 D0].

Figure 6:
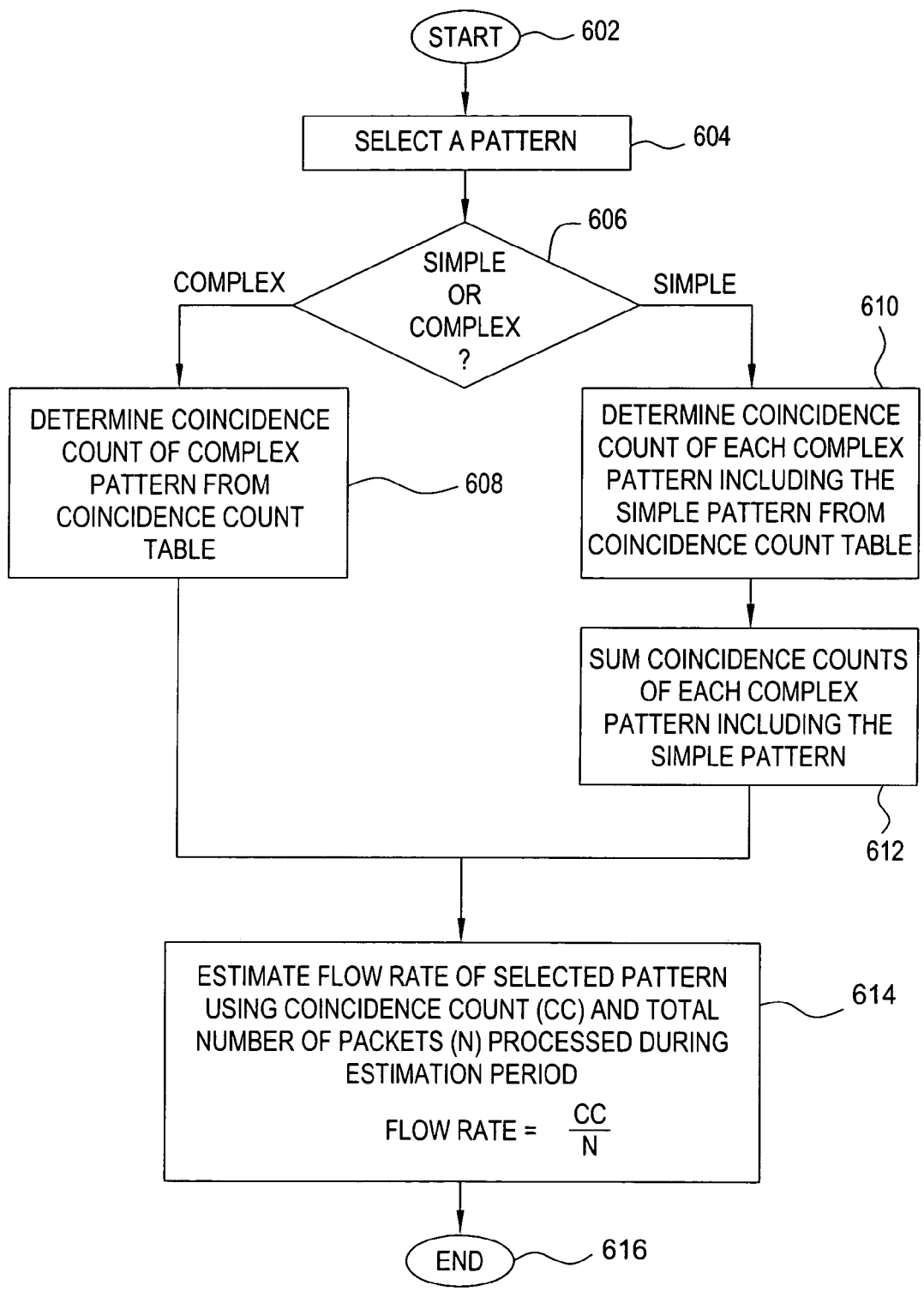
FIG. 6 depicts a method according to one embodiment of the present invention.

FIG. 6 depicts a method according to one embodiment of the present invention. Specifically, method 600 of FIG. 6 includes a method for determining an estimated flow rate for a pattern using a coincidence count table. Although described herein with respect to one of the nodes 112, method 500 may be performed at each of the nodes 112, or, alternatively, a management system (illustratively, management system 120). Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, a pattern is selected (i.e., a pattern for which at least one flow statistic, e.g., an estimated flow rate, is determined). At step 606, a determination is made as to whether the selected pattern is a simple pattern or a complex pattern. If the selected pattern is a complex pattern, method 600 proceeds to step 608. If the selected pattern is a simple pattern, method 600 proceeds to step 610. At step 608, a coincidence count of the complex pattern is determined. In one embodiment, the coincidence count of the complex pattern is determined from a coincidence count table using the complex pattern as a key into the coincidence count table.

At step 610, a coincidence count of each complex pattern including the simple pattern is determined. In one embodiment, the coincidence count of each complex pattern including the simple pattern is determined from a coincidence count table by using the simple pattern as a key into the coincidence count table. In this embodiment, each complex pattern within the coincidence count table is searched for identifying each complex pattern including the selected simple pattern. At step 612, the coincidence counts of each complex pattern including the simple pattern are summed. From each of steps 608 and 612, method 600 proceeds to step 614.

At step 614, an estimated flow rate of the selected pattern is determined using the coincidence count (CC) and the total number of packets (N) processed during the estimation period (i.e., FLOW RATE=CC/N). At step 616, method 600 ends. Although method 600 of FIG. 6 is depicted and described with respect to determining an estimated flow rate for a selected pattern, various other flow statistics may be determined using one or more coincidence count tables, as well as various other pattern tracking tables, generated using various combinations of at least portions of methods 300, 400, and 500 of FIG. 3, FIG. 4, and FIG. 5, respectively.

Although depicted and described with respect to specific methods 300-600 of FIG. 3-FIG. 6, respectively, various embodiments of the present invention may be implemented using various combinations of methods 300-600 of FIG. 3-FIG. 6, respectively. In one embodiment, at least a portion of the steps depicted and described with respect to method 400 of FIG. 4 may be implemented within (in place of or in combination with) method 300 of FIG. 3. In one embodiment, method 500 of FIG. 5 may be repeated for each intersection $(P_j \cap P_{j-1})_k$ computed within the context of methods 300 and 400 of FIG. 3 and FIG. 4. In one embodiment, one or more of methods 300-500 of FIG. 3-FIG. 5, respectively, may be utilized for generating one or more coincidence count tables for use in determining flow statistics (an embodiment of which is depicted and described with respect to method 600 of FIG. 6).

In one embodiment, at least a portion of the present invention may be adapted for performing fixed-location pattern identification for estimating pattern rates of fixed-location patterns. In general, identification of coincidences for fixed-location patterns in consecutive packet payloads may be significantly easier than embodiments in which identification of coincidences is performed for unknown patterns located anywhere within a packet payload. In one such embodiment, in which the location of a pattern of interest within a packet payload is known in advance, patterns starting from the beginning of a packet payload may be of interest.

In one embodiment, beginning with the first byte of current payload $P_j$ and the first byte of previous payload $P_{j-1}$, each byte of current payload $P_j$ and previous payload $P_{j-1}$ may be compared until a difference is identified. For example, assuming current payload $P_j$=[32 45 56 67 78 3 34 12 56 D0E4] and previous payload $P_{j-1}$=[32 45 56 67 98 B4 67 12 56 D0], the intersection $(P_j \cap P_{j-1})_3$ is [34 45 56 67]. In one embodiment, intersection $(P_j \cap P_{j-1})_k$ may be computed by direct comparison. In another embodiment, the comparison may be improved by selecting x random bytes (where x<k) from identical positions within current payload $P_j$ and previous payload $P_{j-1}$, and determining whether the randomly selected bytes are identical.

In this embodiment, if the x randomly selected bytes are not identical, there is no intersection between current payload $P_j$ and previous payload $P_{j-1}$ (i.e., no coincidence is identified). In this embodiment, if the x randomly selected bytes are identical, there may be an intersection between current payload $P_j$ and previous payload $P_{j-1}$, and a full byte-by-byte comparison is performed for determining if there is a coincidence between current-payload $P_j$ and previous payload $P_{j-1}$. In other words, performing an initial random byte comparison on a portion of the positions within the fixed location reduces the number of full byte-by-byte comparison required for identifying coincidences between consecutive packet payloads. An exemplary method is depicted and described herein with respect to FIG. 7.

Figure 7:
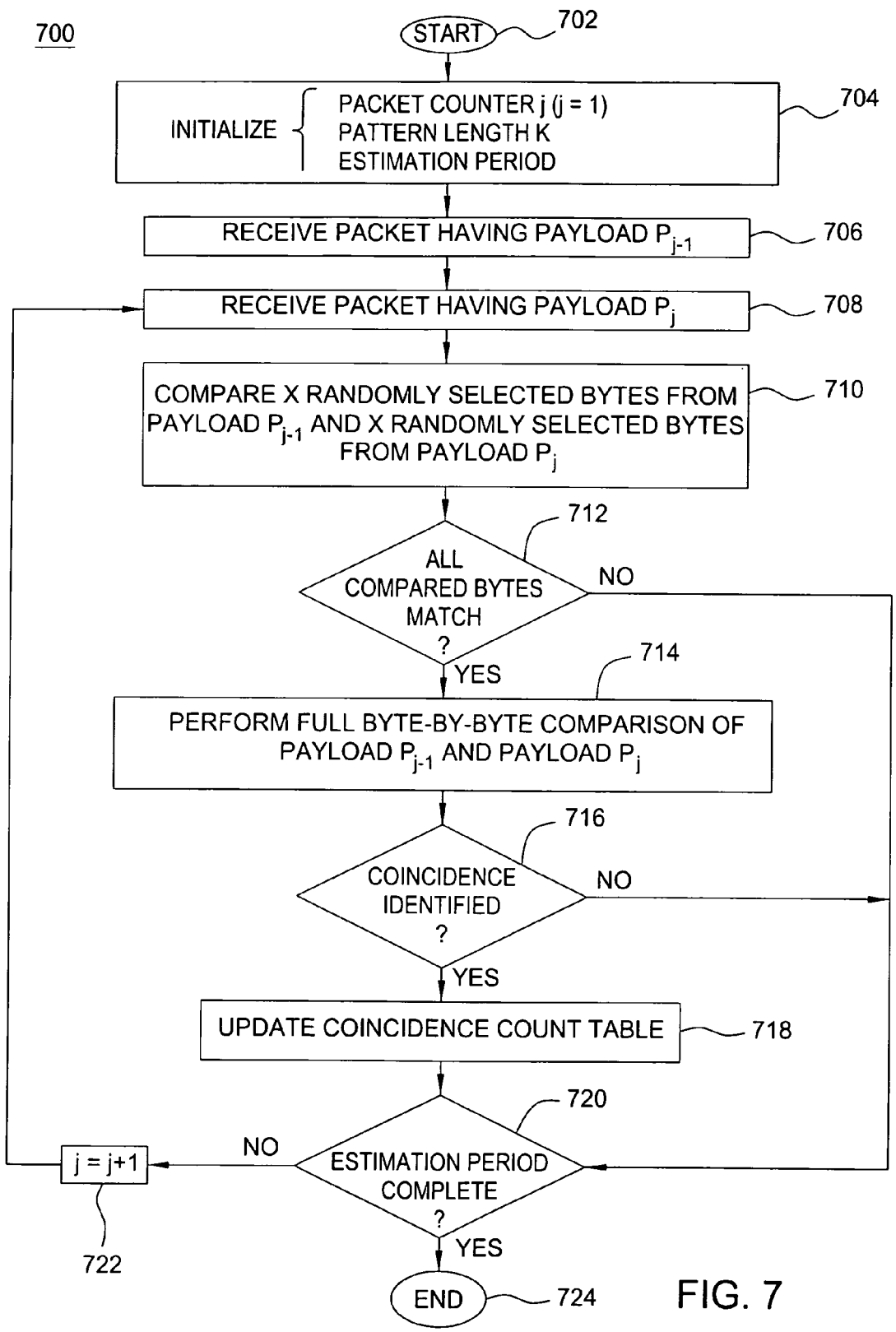
FIG. 7 depicts a method according to one embodiment of the present invention.

FIG. 7 depicts a method according to one embodiment of the present invention. Specifically, method 700 of FIG. 7 includes a method for identifying coincidences for known patterns at fixed locations within associated packet payloads. Although described herein with respect to one of the nodes 112, method 700 may be performed at each of the nodes 112. Although depicted as being performed serially, those skilled in the art will appreciate that at least a portion of the steps of method 700 may be performed contemporaneously, or in a different order than presented in FIG. 7. The method 700 begins at step 702 and proceeds to step 704.

At step 704, a packet counter (denoted as j) is initialized to one (i.e., j=1), a pattern length k is initialized, and an estimation period is initialized. At step 706, a packet having a payload $P_{j-1}$ is received (denoted as a previous payload). At step 708, a packet having a payload $P_j$ is received (denoted as a current payload). At step 710, X randomly selected bytes from payload $P_{j-1}$ and X randomly selected bytes from payload $P_j$ are compared. At step 712, a determination is made as to whether all compared bytes match. In one embodiment, the determination may comprise a determination as to whether at least a threshold number of compared bytes match. If all compared bytes do not match, method 700 proceeds to step 720. If all compared bytes do match, method 700 proceeds to step 714.

At step 714, a full byte-by-byte comparison of payloads $P_{j-1}$ and $P_j$ is performed. At step 716, a determination is made as to whether a coincidence is identified. The identification of a coincidence based on the full byte-by-byte comparison may be performed using any definition of coincidence described herein. If a coincidence is not identified, method 700 proceeds to step 720. If a coincidence is identified, method 700 proceeds to step 718. At step 718, an associated coincidence count table is updated. In one embodiment, updating of the coincidence count table may be performed using any of a plurality of coincidence count table update methods described herein.

At step 720, a determination is made as to whether the estimation period is complete. In one embodiment, the estimation period may include at least one of a length of time, a number of processed packets, and the like, as well as various combinations thereof. If the estimation period is not complete, method 700 proceeds to step 722. At step 722, the packet counter j is incremented by one (i.e., j=j+1). In other words, the current packet becomes the previous packet for comparison with the next received packet. From step 722, method 700 returns to step 708, at which point a packet having payload $P_j$ is received. If the estimation period is complete, method 700 proceeds to step 724. At step 724, method 700 ends.

In one embodiment, the present invention may be adapted for performing similar pattern identification for estimating pattern rates of similar patterns. In one embodiment, a coincidence between consecutive payloads is identified if a number of patterns common to the consecutive payloads is greater than a similar pattern threshold. For example, assuming current payload $P_j$=[32 45 78 23 56 67 99 78 3 34 12 56] and previous payload $P_{j-1}$=[32 45 187 56 67 98 78 3 12 56 12 23], the intersection $(P_j \cap P_{j-1})_2$ includes four simple patterns: [32 45], [56 67], [78 3], and [12 56]. In continuation of this example, assuming a similar pattern threshold of three (i.e., consecutive payloads must have at least three two-patterns in common in order for a coincidence to be identified), a coincidence is identified for current payload $P_j$ and previous payload $P_{j-1}$ since a comparison of the consecutive payloads resulted in identification of four two-patterns. An exemplary method is depicted and described herein with respect to FIG. 8.

Figure 8:
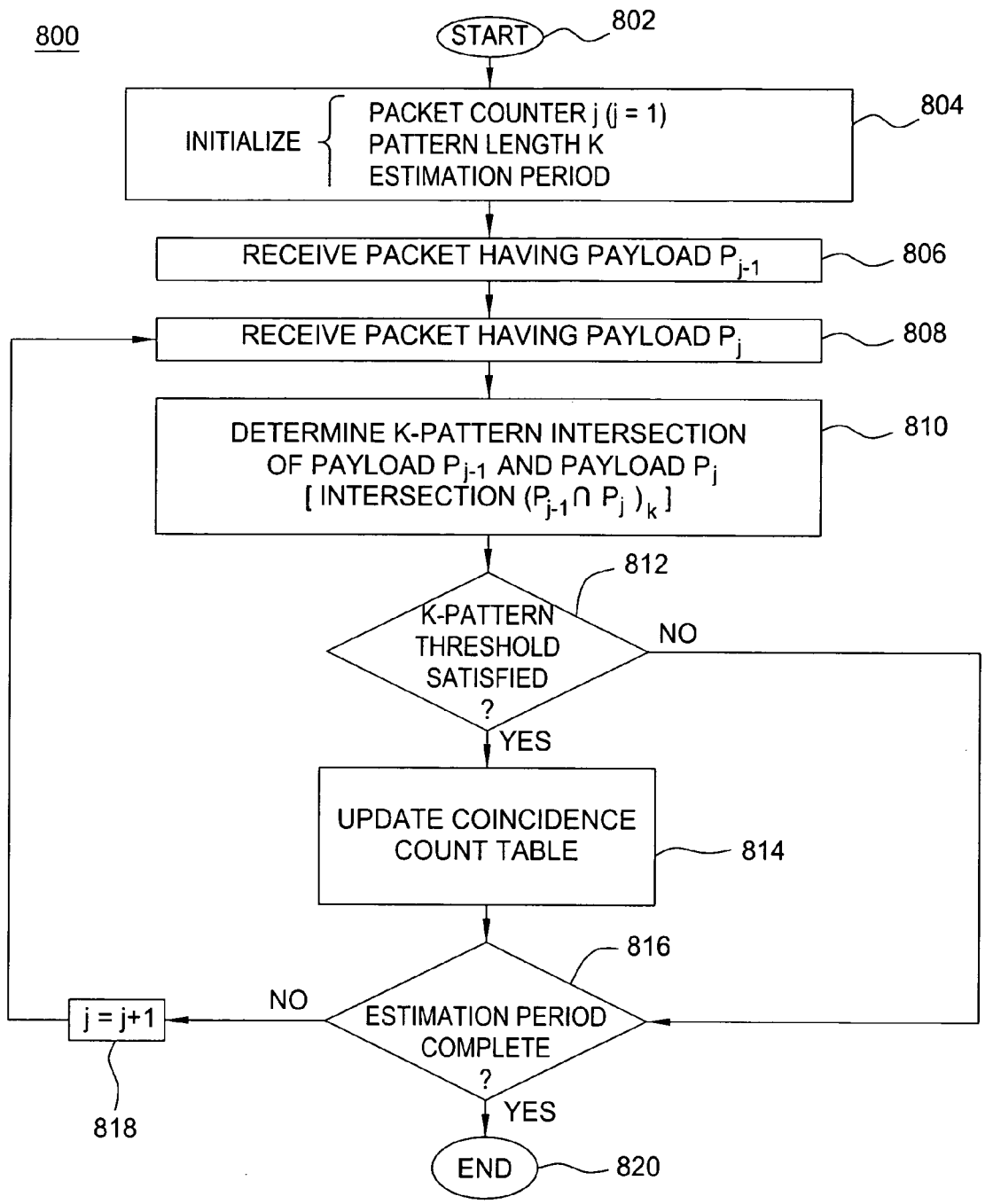
FIG. 8 depicts a method according to one embodiment of the present invention.

FIG. 8 depicts a method according to one embodiment of the present invention. Specifically, method 800 of FIG. 8 includes a method for identifying coincidences using a number of k-simple-patterns identified in consecutive packet payloads. Although described herein with respect to one of the nodes 112, method 800 may be performed at each of the nodes 112. Although depicted as being performed serially, those skilled in the art will appreciate that at least a portion of the steps of method 800 may be performed contemporaneously, or in a different order than presented in FIG. 8. The method 800 begins at step 802 and proceeds to step 804.

At step 804, a packet counter (denoted as j) is initialized to one (i.e., j=1), a pattern length k is initialized, and an estimation period is initialized. At step 806, a packet having a payload $P_{j-1}$ is received (denoted as a previous payload). At step 808, a packet having a payload $P_j$ is received (denoted as a current payload). At step 810, a k-pattern intersection $(P_{j-1} \cap P_{j-1})_k$ of previous payload $P_{j-1}$ and current payload $P_j$ is determined. In one embodiment, the k-pattern intersection comprises a k-simple-pattern intersection (i.e., longest intersection processing is not performed). In one embodiment, processing for identifying a k-pattern intersection of previous payload $P_{j-1}$ and current payload $P_j$ is performed using at least a portion of the methodologies depicted and described herein.

At step 812, a determination is made as to whether a k-pattern threshold is satisfied. In one embodiment, the k-pattern threshold is a number of k-patterns identified from a payload intersection. In one embodiment, k-pattern threshold may be set according to at least one of k-pattern size, an average packet payload size, and the like, as well as various combinations thereof. If the k-pattern threshold is not satisfied, method 800 proceeds to step 816. If the k-pattern threshold is satisfied, method 800 proceeds to step 814. At step 814, an associated coincidence count table is updated. In one embodiment, updating of the coincidence count table may be performed using any of a plurality of coincidence count table update methods described herein.

At step 816, a determination is made as to whether the estimation period is complete. In one embodiment, the estimation period may include at least one of a length of time, a number of processed packets, and the like, as well as various combinations thereof. If the estimation period is not complete, method 800 proceeds to step 818. At step 818, the packet counter j is incremented by one (i.e., j=j+1). In other words, the current packet becomes the previous packet for comparison with the next received packet. From step 818, method 800 returns to step 808, at which point a packet having payload $P_j$ is received. If the estimation period is complete, method 800 proceeds to step 820. At step 820, method 800 ends.

Figure 9:
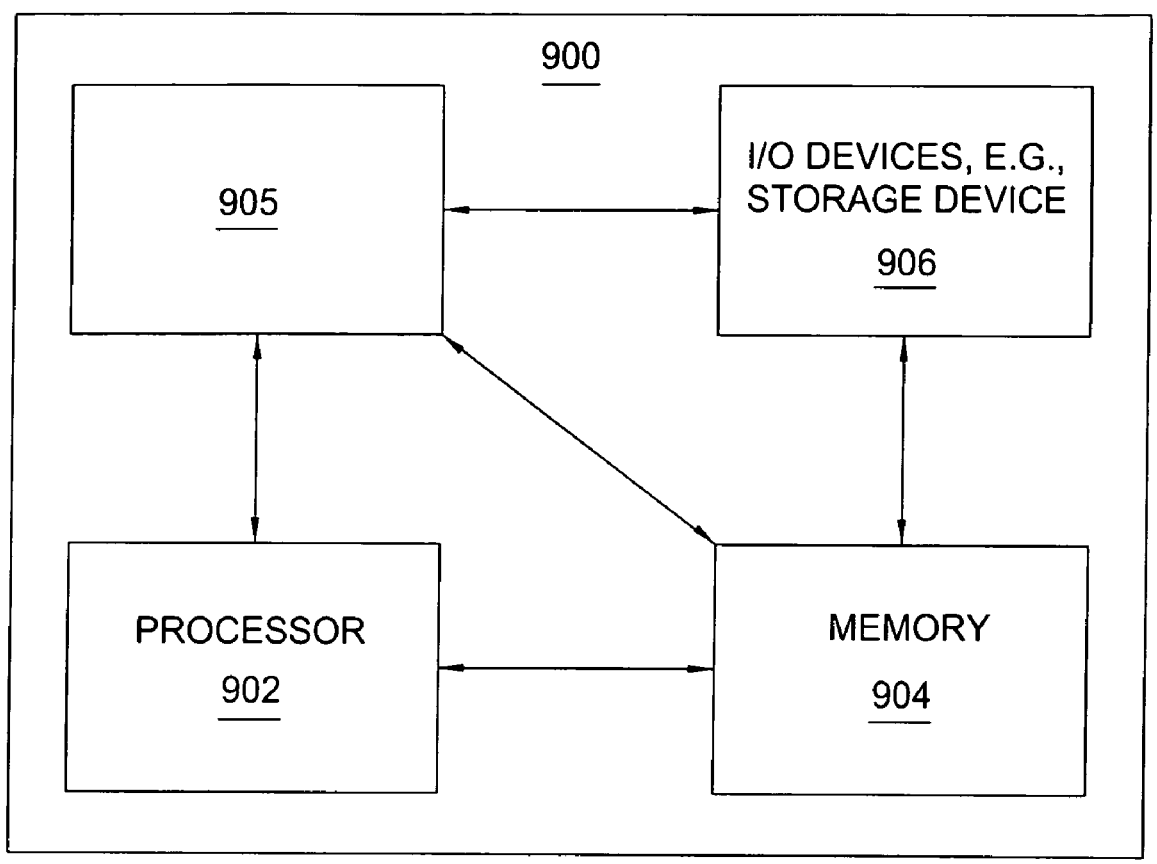
FIG. 9 depicts a high-level block diagram of a general-purpose computer suitable for use in performing the functions described herein.

FIG. 9 depicts a high-level block diagram of a general purpose computer suitable for use in performing the functions described herein. As depicted in FIG. 9, system 900 comprises a processor element 902 (e.g., a CPU), a memory 904, e.g., random access memory (RAM) and/or read only memory (ROM), a coincidence tracking control module 905, and various input/output devices 906 (e.g., storage devices, including but not limited to, a tape drive, a floppy drive, a hard disk drive or a compact disk drive, a receiver, a transmitter, a speaker, a display, in input port, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer, or any other hardware equivalents. In one embodiment, the present coincidence tracking control module or process 905 can be loaded into memory 904 and executed by processor 902 to implement the functions as discussed above. As such, coincidence tracking control process 905 (including associated data structures) of the present invention can be stored on a computer readable medium or carrier, e.g., RAM memory, magnetic or optical drive or diskette and the like.

In one embodiment, the number of payloads that must be analyzed depends on desired accuracy of the estimator, as well as the variance of the estimator. In this embodiment, in order to determine the number of payloads required in order to estimate pattern rates to a desired level of accuracy, the mean and variance of the number of coincidences for a given pattern Q must be determined. The coincidences are dependent. The determination of the mean and variance of the number of coincidences for a given pattern Q involves computing the mean and variance of the coincidence counting process. As described herein, flow definition is determined dynamically (i.e., flow definition is not pre-specified).

In one embodiment, given a k-pattern $Q_K$, $f_Q$ may denote the fraction of packets including k-pattern Q. In one further embodiment, $f_Q$ may denote the probability that the next packet arrival includes k-pattern Q (an assumption that will typically hold in a core network in which significant traffic mixing occurs). In this embodiment, letting S(Q) denote the number of coincidences for pattern Q after N arrivals, mean $E[S(Q)]=f_Q^2$ and variance $VAR[S(Q)]=f_Q^2(1+2f_Q-3f_Q^2)$. In this embodiment, assuming fixed accuracy level $\beta$ and probability $\alpha$, letting $Z_\alpha$ denote the $\alpha$ percentile of the unit normal distribution, and letting S(Q) represent the number of coincidences for k-pattern Q after N packet arrivals (where $N=Z_\alpha^2/3\beta^2$), then $\hat{f}_Q=\sqrt{(S(Q)/N)}$ is an estimator for $f_Q$ and, with probability greater than $\alpha$, $\hat{f}_Q \in (f_Q-\beta, f_Q+\beta)$.

In one embodiment, following the end of the estimation period, the coincidence table may be processed for identifying significant patterns, as well as the associated pattern rates of the identified significant patterns. In one such embodiment, significant patterns (e.g., patterns occurring frequently) may be identified by counting coincidences in the coincidence table. In one embodiment, a pattern rate for pattern Q may be estimated using a number of coincidences for pattern Q. In one embodiment, the number of coincidences for pattern Q may be determined by summing all coincidences for all patterns containing pattern Q. In this embodiment, given a pattern Q, and letting R(Q) denote the set of patterns in the coincidence count table including the pattern Q, the fraction of packets including pattern Q may be computed as:

$$\hat{f}_Q = \sqrt{(\sigma_{P \in R(Q)} S(R))/N}.$$

In one embodiment, the size of the coincidence count table is bounded. Since each processed payload is mapped to a maximum of one pattern (i.e., a complex pattern) in the coincidence count table (i.e., payloads for which a coincidence is not identified are not mapped to a pattern), a probability metric may be determined by the coincidence counter. Furthermore, unique mapping of patterns ensures that the sum of probability measures is bounded by one. The probability that pattern Q experiences a coincidence after N arrivals is upper-bounded by: $(1-f_q^2)^N$. The probability that pattern Q does not have a coincidence is greater than: $1-(1-f_q^2)^N$. As such, given the reduced variance of the coincidence process, and the resulting reduction in sample size, an upper bound on the length of the coincidence table may be determined.

Although various embodiments which incorporate the teachings of the present invention have been shown and described in detail herein, those skilled in the art can readily devise many other varied embodiments that still incorporate these teachings.

What is claimed is:

1. A method for updating a coincidence count table adapted for determining at least one flow statistic, comprising:
   receiving a first packet comprising a first payload and a second packet comprising a second payload;
   comparing the first payload and the second payload for identifying a plurality of simple patterns included within both the first payload and the second payload, wherein each of the identified simple patterns is a longest pattern;
   forming a complex pattern using the simple patterns; and
   updating, in the coincidence count table, a coincidence count associated with the complex pattern.

2. The method of claim 1, wherein comparing the first payload and the second payload comprises:
   obtaining a comparison function associated with the first payload;

identifying each of a plurality of second comparison patterns from the second payload; and comparing each of the plurality of second comparison patterns with the comparison function for identifying the simple patterns.

3. The method of claim 2, wherein obtaining the comparison function comprises:

computing at least one first hash function for each of a plurality of first comparison patterns from the first payload; and processing each of the at least one first hash function for each of the plurality of first comparison patterns for forming the comparison function.

4. The method of claim 3, wherein each of the plurality of second comparison patterns from the second payload is identified using a sliding window.

5. The method of claim 3, wherein comparing each of the plurality of second comparison patterns with the comparison function comprises:

computing at least one second hash function for each of the plurality of second comparison patterns from the second payload; and comparing each of the at least one second hash function for each of the plurality of second comparison patterns with the comparison function for identifying the simple patterns.

6. The method of claim 5, wherein, for each of the plurality of second comparison patterns, comparing the second comparison pattern with the comparison function further comprises:

in response to a potential match between the at least one second hash function of the second comparison pattern and the comparison function, performing a string match between the second comparison pattern and the first payload.

7. The method of claim 6, further comprising:

in response to the string match being positive, determining a result of a previous string match performed for an immediately previous one of the second comparison patterns; and in response to the result of the previous string match being positive, combining a previous partial simple pattern identified for the immediately previous one of the second comparison patterns and a current partial simple pattern identified in response to the string match between the second comparison pattern and the first payload being positive, and storing the combined simple pattern; or in response to the result of the previous string match being negative, storing the current partial simple pattern identified in response to the string match between the second comparison pattern and the first payload being positive.

8. The method of claim 6, further comprising:

in response to the string match being negative, ignoring the potential match between the at least one second hash function of the second comparison pattern and the comparison function as a false positive.

9. The method of claim 1, wherein updating a coincidence count associated with the complex pattern comprises:

searching a coincidence count table using the complex pattern; and if the complex pattern is identified in the coincidence count table, incrementing the coincidence count associated with the complex pattern by one; or if the complex pattern is not identified in the coincidence count table, creating an entry in the coincidence count table for the complex pattern and setting the coincidence count associated with the complex pattern to one.

10. The method of claim 1, further comprising:

selecting a search pattern;

determining a type of the search pattern, wherein the type comprises one of a simple search pattern or a complex search pattern; and performing one of:

if the type is a complex search pattern, searching the coincidence count table for the complex search pattern and returning the coincidence count associated with the complex search pattern; or if the type is a simple search pattern, searching each entry of the coincidence count table for the simple search pattern and returning a summation of each coincidence count associated with each complex search pattern comprising the simple search pattern.

11. An apparatus for updating a coincidence count table adapted for determining at least one flow statistic, comprising:

means for receiving a first packet comprising a first payload and a second packet comprising a second payload;

means for comparing the first payload and the second payload for identifying a plurality of simple patterns included within both the first payload and the second payload, wherein each of the identified simple patterns is a longest pattern;

means for forming a complex pattern using the simple patterns; and means for updating, in the coincidence count table, a coincidence count associated with the complex pattern.

12. The apparatus of claim 11, wherein the means for comparing the first payload and the second payload comprises:

means for obtaining a comparison function associated with the first payload;

means for identifying each of a plurality of second comparison patterns from the second payload; and means for comparing each of the plurality of second comparison patterns with the comparison function for identifying the simple patterns.

13. The apparatus of claim 12, wherein the means for obtaining the comparison function comprises:

means for computing at least one first hash function for each of a plurality of first comparison patterns from the first payload; and means for processing each of the at least one first hash function for each of the plurality of first comparison patterns for forming the comparison function.

14. The apparatus of claim 13, wherein each of the plurality of second comparison patterns from the second payload is identified using a sliding window.

15. The apparatus of claim 13, wherein the means for comparing each of the plurality of second comparison patterns with the comparison function comprises:

means for computing at least one second hash function for each of the plurality of second comparison patterns from the second payload; and means for comparing each of the at least one second hash function for each of the plurality of second comparison patterns with the comparison function for identifying the simple patterns.

16. The apparatus of claim 15, wherein, for each of the plurality of second comparison patterns, the means for comparing the second comparison pattern with the comparison function further comprises:

means for, in response to a potential match between the at least one second hash function of the second comparison pattern and the comparison function, performing a string match between the second comparison pattern and the first payload.

17. The apparatus of claim 16, further comprising:

means for, in response to the string match being positive, determining a result of a previous string match performed for an immediately previous one of the second comparison patterns; and means for performing one of:

in response to the result of the previous string match being positive, combining a previous partial simple pattern identified for the immediately previous one of the second comparison patterns and a current partial simple pattern identified in response to the string match between the second comparison pattern and the first payload being positive, and storing the combined simple pattern; or in response to the result of the previous string match being negative, storing the current partial simple pattern identified in response to the string match between the second comparison pattern and the first payload being positive.

18. The apparatus of claim 11, wherein the means for updating the coincidence count associated with the complex pattern comprises:

means for searching a coincidence count table using the complex pattern; and means for performing one of:

if the complex pattern is identified in the coincidence count table, incrementing the coincidence count associated with the complex pattern by one; or if the complex pattern is not identified in the coincidence count table, creating an entry in the coincidence count table for the complex pattern and setting the coincidence count associated with the complex pattern to one.

19. The apparatus of claim 11, further comprising:

means for selecting a search pattern;

means for determining a type of the search pattern, wherein the type comprises one of a simple search pattern or a complex search pattern; and means for performing one of:

if the type is a complex search pattern, searching the coincidence count table for the complex search pattern and returning the coincidence count associated with the complex search pattern; or if the type is a simple search pattern, searching each entry of the coincidence count table for the simple search pattern and returning a summation of each coincidence count associated with each complex search pattern comprising the simple search pattern.

20. A method for updating a coincidence count table adapted for determining at least one flow statistic, comprising:

receiving a first packet comprising a first payload and a second packet comprising a second payload;

determining a k-pattern intersection of the first payload and the second payload, wherein the k-pattern intersection comprises one or more k-simple-patterns included within both the first payload and the second payload, wherein each of the one or more simple-patterns includes at least k consecutive bytes common to both the first payload and the second payload, wherein each of the one or more k-simple-patterns is a longest pattern; and updating, in the coincidence count table, a coincidence count associated with the k-pattern intersection.

21. The method of claim 1, wherein each of the identified simple patterns is a k-simple-pattern including at least k consecutive bytes common to both the first payload and the second payload.

22. The method of claim 1, wherein the plurality of simple patterns includes all simple patterns common to both the first payload and the second payload.

* * * * *

UNITED STATES PATENT AND TRADEMARK OFFICE
CERTIFICATE OF CORRECTION

| | | |
|---|---|---|
| PATENT NO. | : 7,639,611 B2 | Page 1 of 1 |
| APPLICATION NO. | : 11/372898 | |
| DATED | : December 29, 2009 | |
| INVENTOR(S) | : Hao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Twenty-first Day of December, 2010

David J. Kappos
*Director of the United States Patent and Trademark Office*